United States Patent
Miura

(10) Patent No.: US 8,612,123 B2
(45) Date of Patent: Dec. 17, 2013

(54) INTERNAL COMBUSTION ENGINE CONTROL DEVICE

(75) Inventor: Hajime Miura, Tama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 637 days.

(21) Appl. No.: 12/990,691

(22) PCT Filed: Apr. 23, 2009

(86) PCT No.: PCT/JP2009/058537
§ 371 (c)(1),
(2), (4) Date: Nov. 2, 2010

(87) PCT Pub. No.: WO2009/142106
PCT Pub. Date: Nov. 26, 2009

(65) Prior Publication Data
US 2011/0048349 A1 Mar. 3, 2011

(30) Foreign Application Priority Data

May 19, 2008 (JP) ................................ 2008-130449

(51) Int. Cl.
*F01L 13/00* (2006.01)
*F02D 13/02* (2006.01)
*F01L 1/34* (2006.01)

(52) U.S. Cl.
USPC ........................................ 701/112; 123/90.15

(58) Field of Classification Search
USPC ............... 701/112, 102, 101; 123/90.15, 491, 123/179.3
See application file for complete search history.

(56) References Cited

U.S. PATENT DOCUMENTS

| 5,850,811 | A | * | 12/1998 | Tomisawa et al. | 123/90.15 |
| 6,062,182 | A | | 5/2000 | Ogawa | |
| 6,772,720 | B2 | | 8/2004 | Majima | |
| 7,063,056 | B2 | * | 6/2006 | Nakai et al. | 123/90.15 |
| 7,406,942 | B2 | * | 8/2008 | Ashizawa et al. | 123/491 |
| 2002/0139333 | A1 | | 10/2002 | Kusano et al. | |
| 2004/0112314 | A1 | | 6/2004 | Kanada et al. | |
| 2004/0129239 | A1 | | 7/2004 | Yoshikawa et al. | |
| 2007/0017480 | A1 | | 1/2007 | Kondo | |
| 2011/0192380 | A1 | * | 8/2011 | Tomimatsu et al. | 123/493 |

FOREIGN PATENT DOCUMENTS

| EP | 0 859 130 A1 | 8/1998 |
| EP | 1 803 905 A2 | 7/2007 |
| JP | 6-42379 A | 2/1994 |
| JP | 11-223112 A | 8/1999 |
| JP | 2002-295276 A | 10/2002 |
| JP | 2003-120348 A | 4/2003 |
| JP | 2006-37907 A | 2/2006 |
| JP | 2008-75484 A | 4/2008 |
| JP | 2008-88928 A | 4/2008 |
| WO | WO 2008/026042 A1 | 3/2008 |

* cited by examiner

*Primary Examiner* — Hieu T Vo
(74) *Attorney, Agent, or Firm* — Foley & Lardner LLP

(57) ABSTRACT

A variable valve mechanism provided on a exhaust side of an internal combustion engine, in which a most advanced state is set as an initial state, operating condition detecting means for detecting operating conditions, variable valve control means for controlling an operation of the variable valve mechanism in accordance with the operating conditions, engine condition determining means for determining whether the internal combustion engine is in a cold state or a warm state, and stop request determining means for determining whether or not a stop request has been issued in relation to the internal combustion engine are provided. When a stop request is issued in the cold state, the internal combustion engine is stopped after returning the variable valve mechanism to the initial state.

7 Claims, 4 Drawing Sheets

US 8,612,123 B2

INTERNAL COMBUSTION ENGINE CONTROL DEVICE

TECHNICAL FIELD

This invention relates to control of an internal combustion engine having a variable valve mechanism on a exhaust side.

BACKGROUND ART

A conventional variable valve mechanism varies an opening/closing timing (valve timing) of an intake valve or an exhaust valve to improve an output performance, an emission performance, and a fuel efficiency performance of an internal combustion engine for a vehicle.

For example, JP06042379A, published by the Japan Patent Office in 1994, discloses a technique of reducing an HC discharge amount by performing control to increase an overlap period between an intake valve open period and an exhaust valve open period when an engine is cold using a variable valve mechanism driven by oil pressure.

DISCLOSURE OF THE INVENTION

Incidentally, when an engine is stopped during a valve timing modification operation in a hydraulic variable valve mechanism, the oil pressure decreases as the engine is stopped, and as a result, the valve timing stops in an intermediate position before reaching a target angle. If the engine is restarted in this state, the engine is restarted at a cam phase before the valve timing reaches the target angle, and therefore combustion in the engine becomes unstable. Furthermore, the oil pressure does not increase immediately after the restarting operation, and therefore a vane in the variable valve mechanism may not be able to follow a rotation of a cam sprocket. Accordingly, the vane may collide with an interior wall surface or the like, leading to noise generation.

However, the prior art described above does not disclose control of the variable valve mechanism when an engine operation is stopped.

It is therefore an object of this invention to prevent combustion instability and noise generation caused by a valve timing setting at the time of an engine restarting operation.

To achieve this object, this invention includes a variable valve mechanism provided on a exhaust side of an internal combustion engine, in which a most advanced state is set as an initial state, operating condition detecting means for detecting operating conditions, variable valve control means for controlling an operation of the variable valve mechanism in accordance with the operating conditions, engine condition determining means for determining whether the internal combustion engine is in a cold state or a warm state, and stop request determining means for determining whether or not a stop request has been issued in relation to the internal combustion engine are provided. When a stop request is issued in the cold state, the internal combustion engine is stopped after returning the variable valve mechanism to the initial state.

Details of this invention as well as other features and advantages thereof are set forth in the following description of the specification and illustrated in the attached figures.

BEST MODES FOR CARRYING OUT THE INVENTION

Figure 1:
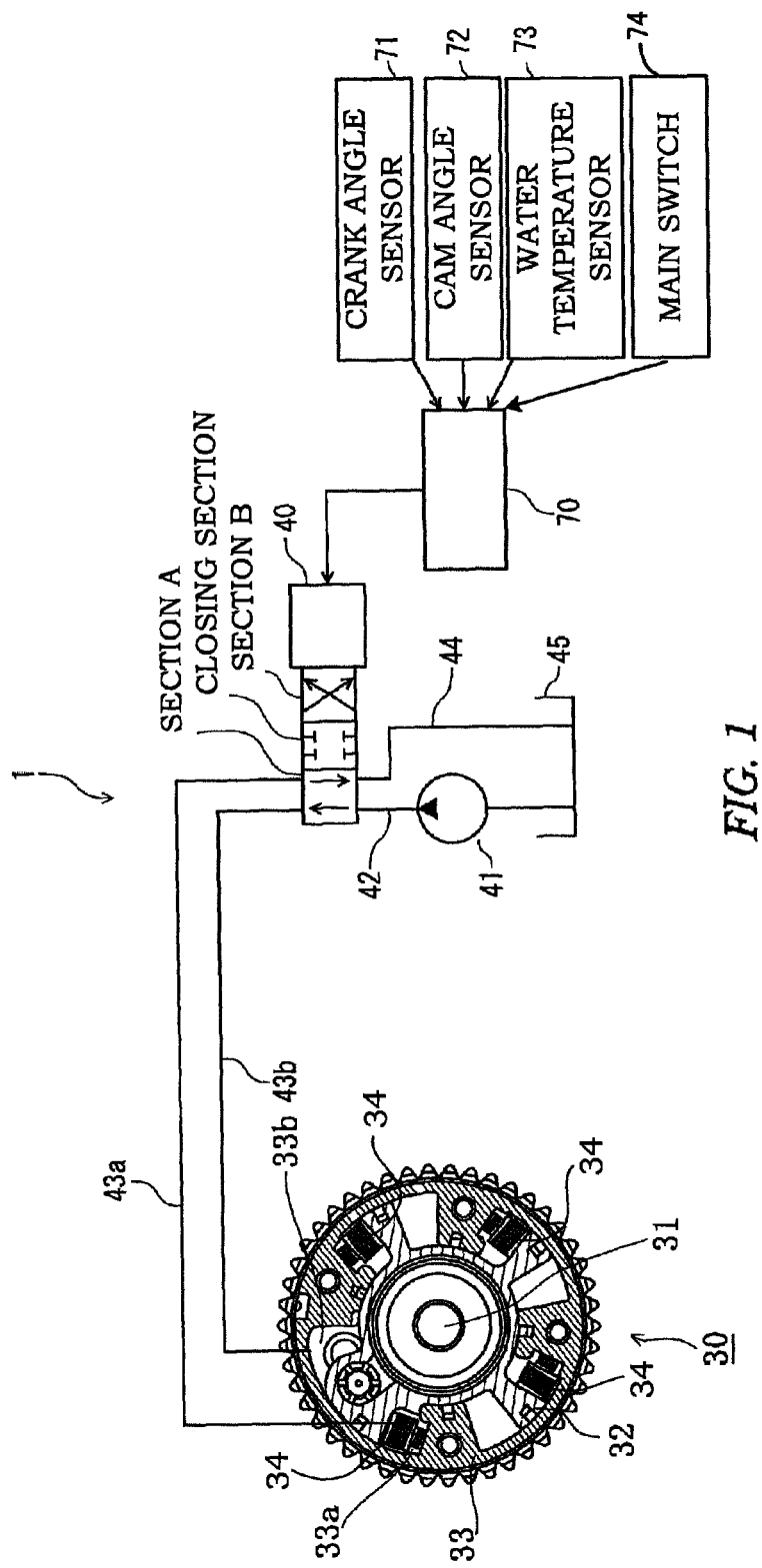
FIG. 1 is a schematic diagram showing the constitution of a control device according to an embodiment of this invention.

Referring to FIG. 1 of the figures, a control device 1 for a vehicle internal combustion engine according to this invention comprises a variable valve mechanism 30, a solenoid valve 40 that operates the variable valve mechanism 30 using oil discharged from an oil pump 41, and a controller 70 that switches the solenoid valve 40.

The engine comprises a cam shaft 31, and a cam shaft driving sprocket (to be referred to hereafter as a "sprocket") 33 that is coaxial with the cam shaft 31 and rotates in synchronization with a crankshaft of the engine via a belt or a chain. The control device 1 uses oil pressure to advance/retard an opening/closing timing of an exhaust valve by modifying a relative phase angle (to be referred to hereafter as a "conversion angle") between the cam shaft 31 and the cam shaft driving sprocket 33.

The variable valve mechanism 31 includes a plurality of vanes (four in FIG. 1) 32 that rotate integrally with the cam shaft 31. It should be noted that during an engine operation, a rotation direction of the cam shaft 31 corresponds to a clockwise direction in FIG. 1.

A space for allowing the vanes 32 to rotate is provided in the cam shaft driving sprocket 33. This space is divided into an advancing hydraulic chamber 33a and a retarding hydraulic chamber 33b by the vanes 32.

The advancing hydraulic chamber 33a is connected to the solenoid valve 40 via an advancement oil passage 43a. The retarding hydraulic chamber 33b is connected to the solenoid valve 40 via a retardation oil passage 43b.

In addition to the advancement oil passage 43a and the retardation oil passage 43b, an oil supply passage 42 in which the oil pump 41 for pumping working oil from an oil pan 45 of the engine is provided midway and a drain passage 44 for returning the working oil to the oil pan 45 are connected to the solenoid valve 40.

The solenoid valve 40 includes a section A for supplying the oil discharged from the oil pump 41 to the advancement oil passage 43b and connecting the drain passage 44 to the retardation oil passage 43b, a section B for supplying the oil discharged from the oil pump 41 to the retardation oil passage 43b and connecting the drain passage 44 to the advancement oil passage 43a, and a closing section for closing both the advancement oil passage 43a and the retardation oil passage 43b.

The controller 70 adjusts or maintains the oil pressure in the advancing hydraulic chamber 33a and the retarding hydraulic chamber 33b by controlling an energization amount applied to the solenoid valve 40 to switch the sections. The variable valve mechanism 30 advances or retards the opening/closing timing (valve timing) of the exhaust valve in accordance with the oil pressure in the advancing hydraulic chamber 33a and retarding hydraulic chamber 33b.

An initial state valve timing corresponds to a most advanced state, and by biasing the vanes 32 in a spring reaction force direction using a torsion spring 34 fixed to the cam shaft driving sprocket 33, a force for maintaining the initial state is applied. In other words, when the engine is stopped, a force for returning the vanes 32 to the initial state is applied by the torsion spring 34 even though hydraulic control is halted.

Advancement/retardation control is performed specifically as follows. When the controller 70 switches the solenoid valve 40 to the section B, the working oil in the oil pan 45 is supplied to the retarding hydraulic chamber 33b through the retardation oil passage 43b. Meanwhile, the working oil in the advancing hydraulic chamber 33a is discharged to the oil pan 45 through the advancement oil passage 43a and the drain passage 44. Therefore, the oil pressure of the retarding hydraulic chamber 33b increases relatively, causing the vanes 32 to rotate against the spring force of the torsion spring 34, and as a result, the valve timing is retarded.

When the controller 70 switches the solenoid valve 40 to the section A, on the other hand, the working oil in the oil pan 45 is supplied to the advancing hydraulic chamber 33a through the advancement oil passage 43a. Meanwhile, the working oil in the retarding hydraulic chamber 33b is discharged to the oil pan 45 through the retardation oil passage 43b and the drain passage 44. Therefore, the oil pressure of the advancing hydraulic chamber 33a increases relatively, and as a result, the valve timing is advanced.

Switching of the solenoid valve 40 is controlled by the controller 70. The controller 70 is constituted by a microcomputer including a central processing unit (CPU), a read-only memory (ROM), a random access memory (RAM), and an input/output interface (I/O interface). The controller 70 may be constituted by a plurality of microcomputers.

A crank angle sensor 71, a cam angle sensor 72, a water temperature sensor 73, and a vehicle main switch 74 are connected to the controller 70 as operating condition detecting means. The crank angle sensor 71 outputs a crank shaft angle signal and outputs a reference crank position signal in a reference rotation position of the crank shaft. The cam angle sensor 72 outputs a reference cam shaft position signal in a reference rotation position of the cam shaft 31. The water temperature sensor 73 outputs an engine water temperature. The main switch 74 outputs an engine start request and an engine stop request.

On the basis of output values from the crank angle sensor 71 and the cam angle sensor 72, the controller 70 calculates a retardation amount of the valve timing and sets the retardation amount as a current conversion angle (to be referred to hereafter as an "actual conversion angle") θ of the variable valve mechanism 30.

More specifically, a projecting or recessed detection subject portion is provided on the cam shaft 31 or a member connected to the cam shaft 31, and when this detection subject portion is detected by the cam angle sensor 72, a rotation signal relating to the cam shaft 31 is output, whereupon an actual retardation amount is detected on the basis of a phase difference between the cam shaft rotation position signal and the reference crank angle position signal output by the crank angle sensor 71. The retardation amount is detected as a retardation amount relative to a reference position in which rotation of the cam shaft 31 is restricted by a mechanical stopper (here, a restriction position on the most advanced side is set as the reference position). By learning the phase deviation from the reference position, the actual retardation amount (an actual conversion angle $\theta_{now}$) relative to the learned reference position can be detected during valve timing control. The controller 70 then controls the energization amount applied to the solenoid valve 40 such that the actual conversion angle $\theta_{now}$ aligns with a target conversion angle $\theta_{com}$ set on the basis of the engine operating conditions.

The aforementioned mechanical stopper is a mechanism for mechanically restricting a relative phase angle of the cam shaft 31 relative to the crankshaft. In other words, a most advanced state and a most retarded state of the valve timing both correspond to a state in which the cam shaft 31 impinges on the mechanical stopper. It should be noted that FIG. 1 shows the most retarded state.

Incidentally, an elastic force of a valve spring provided in the exhaust valve, a frictional force generated relative to a cam holder, and so on act on the cam shaft 31 as drag in a counter-clockwise direction of FIG. 1, or in other words a valve timing retardation direction.

When the engine stops and engine rotation decreases, leading to a reduction in the rotation of the oil pump 41 and a corresponding reduction in oil pressure, the effect of this drag increases.

As a result, the cam shaft 31 may stop in an intermediate state between the most advanced state and the most retarded state before being returned to the most advanced state, i.e. the initial state, by the torsion spring 34 as described above.

Further, a time difference occurs between a point at which engine startup begins and a point at which a discharge pressure of the oil pump 41 rises. Therefore, when the oil pressure is low immediately after engine startup, the aforementioned drag causes the valve timing to vary in the retardation direction. If the vanes 32 collide with the retardation side mechanical stopper at this time, noise is generated.

Hence, depending on the characteristics of the variable valve mechanism 30, the valve timing may become unstable and noise may be generated when the engine is restarted.

To eliminate these problems, the controller 70 executes the control described below.

Figure 2:
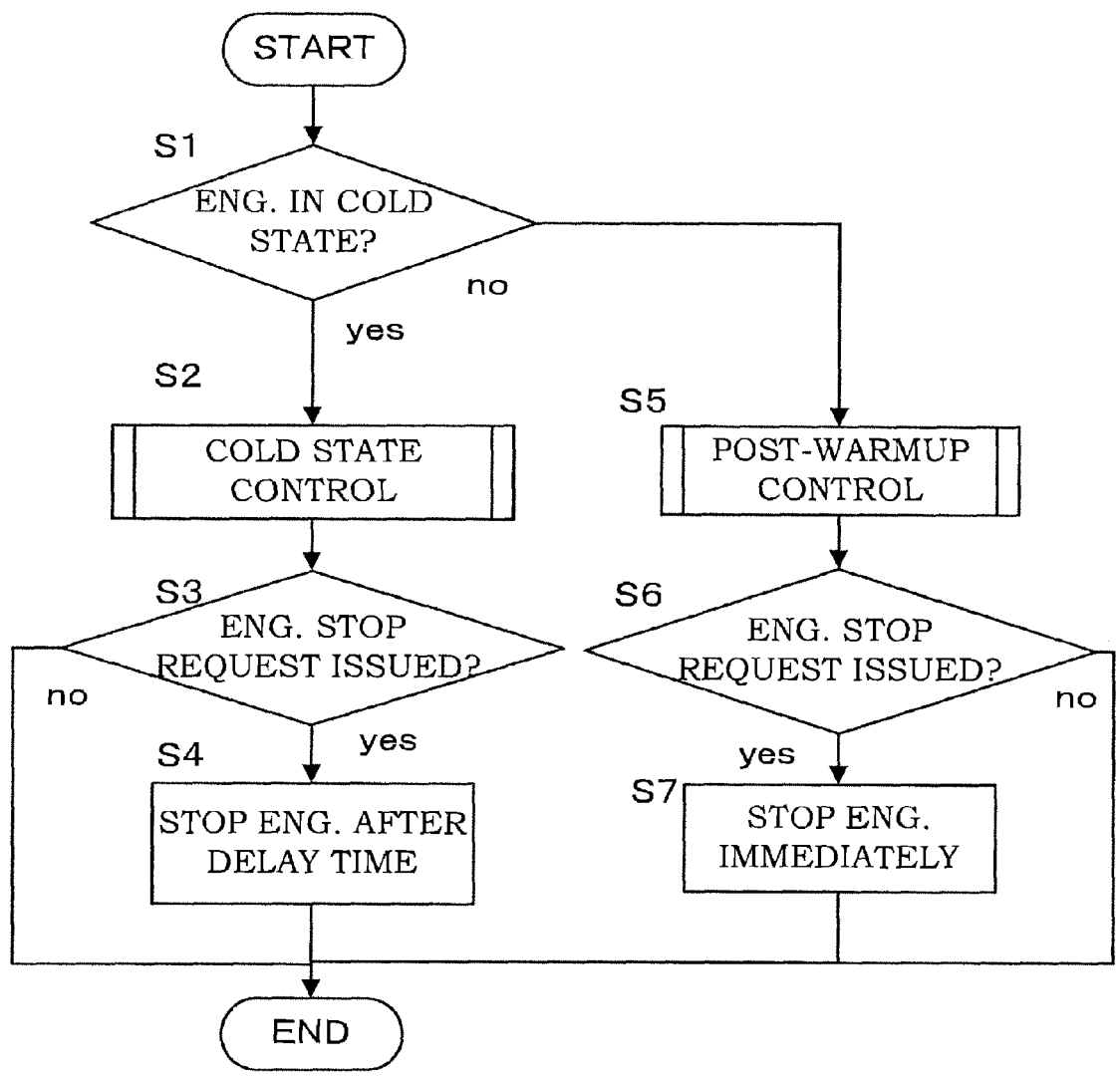
FIG. 2 is a flowchart showing a control routine executed by a controller provided in the control device.

FIG. 2 is a flowchart illustrating a control routine executed by the controller 70. The controller 70 executes this routine at fixed intervals while the engine is operative. The fixed intervals are set at ten milliseconds, for example.

In a step S1, a determination is made as to whether or not the engine is in a cold state. This determination is made by detecting a cooling water temperature, for example.

When the cooling water temperature is lower than a predetermined threshold (to be described as "cold state" hereafter), the routine advances to a step S2, and when the cooling water temperature is higher than the predetermined threshold (to be described as a "warm state" hereafter), the routine advances to a step S5.

Figure 3:
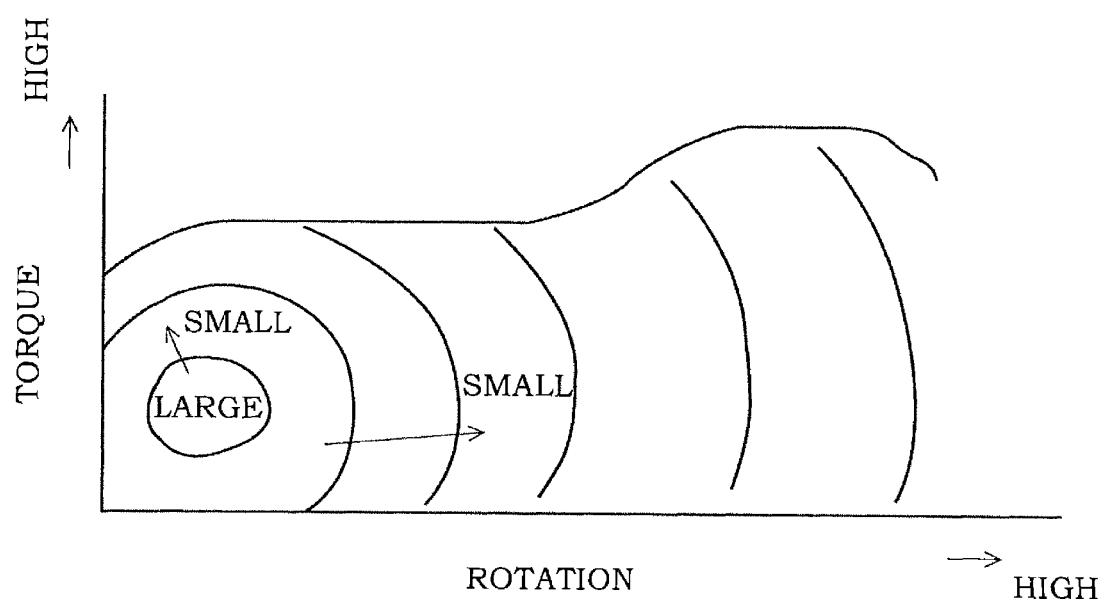
FIG. 3 is a conversion angle map for use during a cold state, which is stored by the controller.

In the step S2, the controller 70 executes valve timing control employing a cold state conversion angle map stored in advance in the ROM. As shown in FIG. 3, for example, the cold state conversion angle map has a characteristic whereby a maximum conversion angle is taken in a low rotation/low load region including an idle operation region and the conversion angle decreases steadily as an engine torque or an engine rotation speed moves further away from the low rotation/low load region. The controller 70 searches the map for a conversion angle on the basis of the engine rotation speed detected by the crank angle sensor and an engine load detected by an accelerator opening sensor, and controls the conversion angle using the found conversion angle as the target conversion angle $\theta_{com}$.

In other words, control is performed to increase the valve timing retardation amount of the exhaust valve in the vicinity of the idle operation region. It should be noted that an intake side variable valve mechanism performs control to advance the valve timing greatly in the idle operation region. Hence, in the idle operation region, a valve overlap period is increased.

In the cold state, fuel vaporization does not occur favorably, and therefore a fuel injection amount is typically increased in anticipation of fuel adhering to an intake pipe wall surface and so on of the engine. Therefore, in comparison with the warm state, a hydrocarbon (HC) concentration of the exhaust gas tends to increase.

Meanwhile, in the idle operation region, an intake negative pressure of the engine is high, and therefore, when a valve overlap period is provided, intake air is not blown out to the discharge side when the intake valve is opened, and conversely, high-temperature exhaust gas is blown back into a combustion chamber from the discharge side.

Hence, by increasing the valve overlap period in the idle operation region of the cold state, high-temperature exhaust gas is blown back into the combustion chamber, thereby promoting fuel atomization in the combustion chamber, and as a result, the HC concentration of the exhaust gas decreases.

In a step S3, the controller 70 determines whether or not an engine stop request has been issued. This determination is made on the basis of an output value from the main switch 74. It should be noted, however, that in the case of a vehicle including a so-called idle stop mechanism, in which reductions in fuel consumption and emissions are achieved by stopping the engine automatically when a predetermined automatic stopping condition is established and starting the engine automatically when a predetermined restarting condition is established while the engine is automatically stopped, establishment of the automatic stopping condition may be considered as a stop request.

When an engine stop request has been issued, the routine advances to a step S4, and when a request has not been issued, the processing is terminated.

In the step S4, the controller 70 sets the target conversion angle $\theta_{com}$ such that the cam shaft 31 reaches the most advanced state, and stops the engine following the elapse of a predetermined delay time. The delay time is set at a sufficient amount of time for the cam shaft 31 to return to the most advanced state, approximately one second, for example. When the delay time is set at one second, the delay time is longer than the execution interval of the routine. However, this does not pose a problem since the engine is stopped following execution of the step S4 and the routine is not executed again until the engine is restarted.

It should be noted that the delay time may be calculated after determining that an engine stop request has been issued on the basis of the conversion angle, the oil pressure, and so on at the time of issuance of the engine stop request. Further, the engine may be stopped after confirming that the cam shaft 31 has actually returned to the most advanced state on the basis of the detection values of the crank angle sensor 71 and the cam angle sensor 72.

By stopping the engine after the delay time has elapsed in this manner, the variable valve mechanism 30 can be set securely in the most advanced state when the engine is stopped. As a result, noise generation when the engine is subsequently started can be prevented reliably.

It should be noted that a time required for the engine to stop after a driver of the vehicle operates the main switch 74 to stop the engine increases by an amount corresponding to the delay time. In the cold state, however, an oil temperature is low and therefore the discharge pressure of the oil pump 41 is relatively high, leading to a relative increase in an operation speed of the variable valve mechanism 30. Therefore, when the delay time is set at a short time of approximately one second, for example, a sense of discomfort experienced by the driver due to the delay time is small. Furthermore, the engine is not often stopped in the cold state following engine startup, and therefore the driver does not experience this sense of discomfort often.

Figure 4:
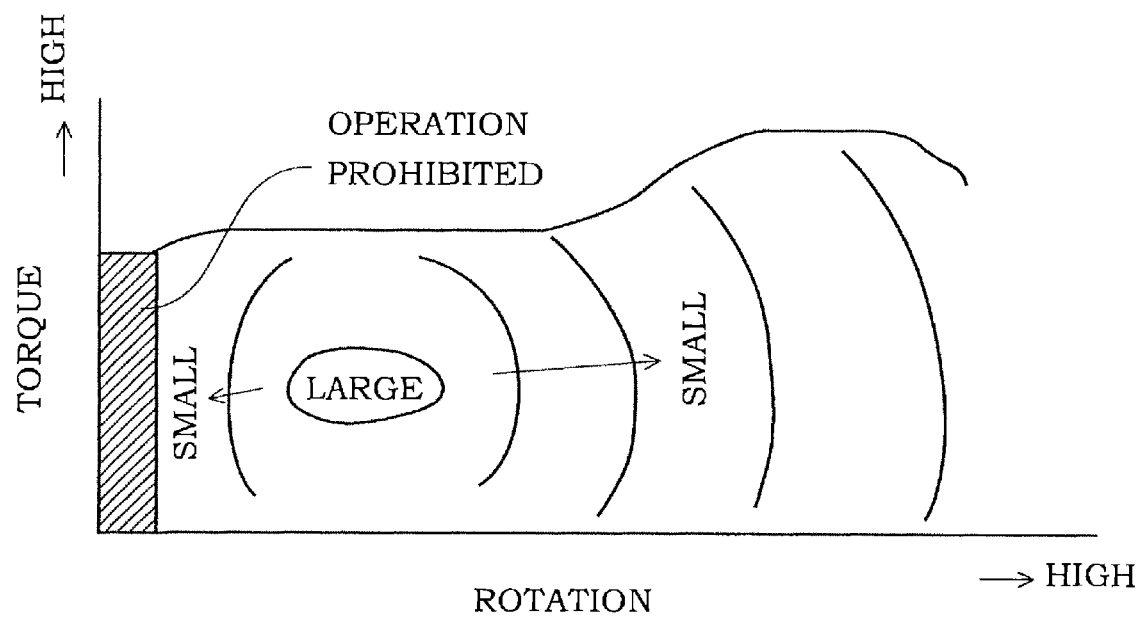
FIG. 4 is a conversion angle map for use during a warm state, which is stored by the controller.

Meanwhile, in the step S5, which is executed when the warm state is established, the controller 70 executes valve timing control employing a \vault state conversion angle map stored in advance in the ROM. The warm state conversion angle map has a characteristic shown in FIG. 4, for example. The warm state conversion angle map differs from the cold state map shown in FIG. 3 in that the low rotation region is provided with an operation prohibition region in which an operation of the variable valve mechanism 30 is prohibited. It should be noted that at least the idle operation region should be included in the operation prohibition region.

In the operation prohibition region, the controller 70 prohibits an operation of the variable valve mechanism 30 by switching the solenoid valve 40 to the closing section.

In a step S6, similarly to the step S3, the controller 70 determines whether or not an engine stop request has been issued. When an engine stop request has been issued, the routine advances to a step S7, and when a request has not been issued, the processing is terminated.

In the step S7, the controller stops the engine without inserting a delay time.

In the warm state, an exhaust gas purification catalyst of the engine is sufficiently warm and the amount of HC discharged from the engine is small, and therefore the valve timing does not play a large role in reducing the HC concentration of the exhaust gas. In other words, an exhaust performance is not greatly affected even when an operation of the variable valve mechanism 30 is prohibited in the idle operation region.

On the other hand, an engine stop request is normally issued during an idle operation in the warm state. Therefore, if an operation of the variable valve mechanism 30 is permitted in the warm state and a delay time is inserted between issuance of the engine stop request and stoppage of the engine, the driver is more likely to experience a sense of discomfort.

Hence, by prohibiting an operation of the variable valve mechanism 30 such that the most advanced state is established in the idle operation region of the warm state, the engine can be stopped without providing a delay time when an engine stop request is issued.

According to this control, the variable valve mechanism 30 is operated in all operating regions of the cold state, whereas an operation is prohibited in the low rotation region, including the idle operation region, of the warm state. Further, when an engine stop request is issued, the engine is stopped after the elapse of the delay time in the cold state but stopped immediately in the warm state.

It should be noted that this invention is not limited to the embodiment described above and may be subjected to various modifications within the scope of the technical spirit described in the claims. For example, the initial state valve timing does not have to be the most advanced position, and a variable valve mechanism capable of control in the retardation direction, or in other words a variable valve mechanism that is set in a predetermined advancement state, may be used.

With regard to the above description, the content of JP2008-130449A with a filing date of May 19, 2008 in Japan is incorporated herein by reference.

Industrial Applicability

As described above, in this invention, a variable valve mechanism is set in a most advanced state when an engine is restarted, and therefore combustion instability and noise generation occurring immediately after the restarting operation can be prevented.

Exclusive properties or features encompassed by the embodiments of this invention are as claimed below.

The invention claimed is:

1. An internal combustion engine control device that controls an opening/closing timing of an exhaust valve in an internal combustion engine, comprising:
   a variable valve mechanism of the exhaust valve, in which an initial state is established when the opening/closing timing of the exhaust valve is in a most advanced state in the variable angle of the phase angle;
   a sensor for detecting whether the internal combustion engine is in a cold state or a warm state;
   a sensor for detecting whether or not the variable valve mechanism is in the initial state;
   a sensor for detecting whether or not a stop request has been issued in relation to the internal combustion engine; and
   a programmable controller programmed to:
   control the variable valve mechanism to the initial state when the stop request is issued in the cold state;
   determine whether or not the variable valve mechanism is in the initial state; and
   stop the internal combustion engine only when the variable valve mechanism is determined to be in the initial state.

2. The internal combustion engine control device as defined in claim 1, wherein the controller is further programmed to control the variable valve mechanism, when the internal combustion engine is in the cold state, in a direction for retarding the opening/closing timing of the exhaust valve to a greater extent in a low rotation region of the engine, which includes at least an idle operation region, than in another rotation region.

3. The internal combustion engine control device as defined in claim 1, wherein the controller is further programmed to measure an elapsed time after the variable valve mechanism is controlled to the initial state and determine that the variable valve mechanism is in the initial state when the elapsed time reaches a predetermined delay time.

4. The internal combustion engine control device as defined in claim 1, wherein the controller is further programmed to prohibit an operation of the variable valve mechanism in the low rotation region of the engine, including at least the idle operation region, when the internal combustion engine is in the warm state.

5. The internal combustion engine control device as defined in claim 1, wherein the controller is further programmed to stop the internal combustion engine immediately when the stop request is issued while the internal combustion engine is in the warm state.

6. The internal combustion engine control device as defined in claim 1, wherein the variable valve mechanism comprises a vane that varies an initial phase of a cam shaft for opening and closing the exhaust valve, and a spring that biases the vane to a position corresponding to the initial state of the variable valve mechanism,
   the control device further comprises a solenoid valve that drives the vane hydraulically, and
   the controller is further programmed to control the variable valve mechanism by controlling the solenoid valve.

7. An internal combustion engine control method for controlling an opening/closing timing of an exhaust valve in an internal combustion engine, a variable valve mechanism in which an initial state is established when an opening/closing timing of the exhaust valve is in a most advanced state in the variable angle of the phase angle being provided in the exhaust valve, the control method comprising:
   detecting whether the internal combustion engine is in a cold state or a warm state;
   detecting whether or not the variable valve mechanism is in the initial state;
   detecting whether or not a stop request has been issued in relation to the internal combustion engine;
   controlling the variable valve mechanism to the initial state when the stop request is issued in the cold state;
   determining whether or not the variable valve mechanism is in the initial state; and
   stopping the internal combustion engine only when the variable valve mechanism is determined to be in the initial state.

* * * * *